US008929896B2

(12) United States Patent
Kurabayashi et al.

(10) Patent No.: US 8,929,896 B2
(45) Date of Patent: Jan. 6, 2015

(54) GEOLOCATION-BASED LOAD BALANCING (76) Inventors: Shuichi Kurabayashi, Fujisawa (JP);
Naofumi Yoshida, Yokohama (JP);
Kosuke Takano, Fujisawa (JP)

(*) Notice: Subject to any disclaimer, the term of this patent is extended or adjusted under 35 U.S.C. 154(b) by 0 days.

(21) Appl. No.: 13/640,888

(22) PCT Filed: Feb. 24, 2012

(86) PCT No.: PCT/US2012/026521
§ 371 (c)(1),
(2), (4) Date: Oct. 12, 2012

(87) PCT Pub. No.: WO2013/126072
PCT Pub. Date: Aug. 29, 2013

(65) Prior Publication Data
US 2013/0225176 A1 Aug. 29, 2013

(51) Int. Cl.
*H04W 36/02* (2009.01)
*H04W 64/00* (2009.01)

(52) U.S. Cl.
CPC .......... *H04W 36/023* (2013.01); *H04W 64/006* (2013.01)
USPC .............................. 455/437; 455/453; 370/351

(58) Field of Classification Search
USPC .......... 455/436–439, 450, 453; 370/229, 230, 370/230.1, 252, 253, 338, 351–356
See application file for complete search history.

(56) References Cited

U.S. PATENT DOCUMENTS

| 5,825,759 | A | * | 10/1998 | Liu ................................ 370/331 |
| 7,519,470 | B2 | | 4/2009 | Brasche et al. |
| 2008/0133766 | A1 | * | 6/2008 | Luo ................................ 709/231 |
| 2008/0207200 | A1 | * | 8/2008 | Fein et al. .................. 455/426.1 |
| 2008/0229023 | A1 | | 9/2008 | Plamondon |
| 2009/0281718 | A1 | | 11/2009 | Gibran et al. |
| 2011/0299494 | A1 | * | 12/2011 | Casey et al. ................... 370/329 |
| 2012/0005251 | A1 | | 1/2012 | Xie et al. |
| 2013/0107728 | A1 | * | 5/2013 | Zhu et al. ...................... 370/252 |

OTHER PUBLICATIONS

International Search Report and Written Opinion from International Application No. PCT/US2012/26521 mailed Feb. 24, 2012.
Mike Hibberd, Smartphone traffic to grow 700% in five years, http://ww.telecoms.com/23187/smartphone-traffic-to-grow-700-in-five-years/, Nov. 2, 2010.
Cisco Visual Networking Index: Global Mobile Data Traffic Forecast Update, 2010-2015, http://www.cisco.com/en/US/Solutions/collateral/ns341/ns525/ns537/ns705/ns827/white_paper_c11-520862.html, Feb. 1, 2011.
Oracle Real Application Clusters, http://www.oracle.com/technetwork/database/clustering/overview/index.html.

(Continued)

*Primary Examiner* — Cong Tran
(74) *Attorney, Agent, or Firm* — Brundidge & Stanger, P.C.

(57) ABSTRACT

Technologies are generally described for geolocation-based load balancing in a cloud computing environment hosting a mobile service. In some examples, a method may include calculating a probability of movement of a user device from a first cell to a second cell, and calculating an amount of cached data to copy from a second cache server corresponding to the second cell to a first cache server corresponding to the first cell based at least in part on the calculated probability.

24 Claims, 7 Drawing Sheets

(56) References Cited

OTHER PUBLICATIONS

Falaki, H., Lymberopoulous, D., Mahajan, R., Kandula, S., Estrin, D.: A first look at traffic on smartphones. Proceedings of the 10$^{th}$ annual conference on Internet measurement, pp. 281-287. ACM, Melbourne, Australia (2010).

Kazuo Goda, et al., Run-Time Load Balancing System on SAN-connected PC Cluster for Dynamic Injection of CPU and Disk Resource—A Case Study of Data Mining Application. DEXA 2002: 182-192.

* cited by examiner

GEOLOCATION-BASED LOAD BALANCING

BACKGROUND

Network traffic associated with high-end mobile devices such as smartphones and tablet computers is increasing. It is predicted that average traffic per user (ATPU) for smartphones will hit 776 megabytes/month by 2015, and the global network traffic associated with smartphones will increase to 6.3 exabytes/month in 2015. As the mobile traffic increases explosively as above, scale-out using cloud computing systems becomes important.

However, the existing infrastructures for implementing a cloud computing environment are typically adapted to business applications, such as an e-mail application and a word processor, that run on personal computers, so that it is difficult to efficiently implement mobile computing applications. For example, with a map application for a mobile service or an information distribution application based on geolocation information, since a large volume of map image data or distribution data is retrieved at once from a database server, communication between the database server and a Web application server tends to become a bottleneck.

SUMMARY

In an example, a method may include calculating a probability of movement of a user device from a first cell to a second cell, and calculating an amount of cached data to copy from a second cache server corresponding to the second cell to a first cache server corresponding to the first cell based at least in part on the calculated probability.

In another example, a method may include dynamically configuring data caches for database servers based at least in part on movement of user devices, and caching geographical data requested by the user devices based on the dynamic configuration.

In yet another example, a load balancer may include a device information extractor configured to extract, from a stream received from a user device, at least one of an identifier and geolocation information associated with the user device; a geolocation mesh manager configured to manage an association between cache servers and real-space cells, wherein each cache server caches, from a database server, information regarding a cell allocated thereto; a movement probability calculator configured to calculate a probability of movement of the user device from a first real-space cell to a second real-space cell; and a copy factor calculator configured to calculate amount of cached data to copy from a second cache server corresponding to the second real-space cell to a first cache server corresponding to the first real-space cell based at least in part on the calculated probability of movement.

In yet another example, a computer-readable storage medium may store a program for implementing load balancing between a database server storing geographical data and a Web application server, and the program may include a geolocation mesh managing module configured to manage association between real-space cells and cache servers, each of which caches from the database server at least a portion of the geographical data associated with a corresponding one of the real-space cells; and a copy factor calculating module configured to calculate amount of cached data to copy from a second cache server corresponding to a second real-space cell to a first cache server corresponding to a first real-space cell based at least in part on a calculated probability of movement of a user device from the first real-space cell to the second real-space cell and a distance between the first real-space cell and the second real-space cell.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to load balancing in a cloud computing environment hosting a mobile service.

Technologies are generally described for a load balancer configured to provide geolocation-based load balancing between a database server and an application server.

In some examples, an application in a cloud computing environment may be implemented using three server layers including a Web server, an application server such as a Web application server, and a database server. In some examples, the load balancer may provide the load balancing between the database server and the application server to resolve a communication bottleneck therebetween due to traffic increases.

In some examples, in case of a map application for a mobile service or an information distribution application based on geolocation information, the load balancer may provide the geolocation-based load balancing between the database server and the application server to resolve the communication bottleneck caused by retrieval of a large volume of map image data or distribution data from the database server.

In some examples, the load balancer may dynamically configure data caches for the database server based at least in part on movement of user devices, and cache geographical data requested by the user devices based at least in part on the dynamic configuration, thereby speeding up data accesses from the application server to the database server.

In some examples, multiple cache servers, such as in-memory cache servers, that cache data retrieved from the database server may be used to reduce a number of accesses from the application server to the database server.

In some examples, to improve response speed and service providing capacity (i.e., the number of user devices that can be connected simultaneously) of the mobile service, the load balancer may manage copies of data among the multiple cache servers.

In some examples, the load balancer may divide a predetermined range or area of real-space into multiple cells, and manage the multiple cache servers such that each of the cache servers caches from the database server geographical data on one of the cells. The load balancer may manage association between the cache servers and the cells.

In some examples, the load balancer may receive a request for geographical data from the user device, and may calculate a probability of movement of the user device from a first cell to a second cell, based at least in part on at least one of an identifier and geolocation information associated with the user device extracted from the received request.

In some examples, the load balancer may calculate the probability statically in advance by using map information.

In some examples, the load balancer may then calculate a copy factor from a second cache server corresponding to the second cell to a first cache server corresponding to the first cell, i.e., an amount of cached data to copy from the second cache server to the first cache server, based at least in part on the calculated probability.

In some examples, by managing the copy factor for all areas and users, the cache servers may be configured to dynamically and/or automatically store information regarding areas to which users are likely to move, thereby reducing the number of accesses from the application server to the database server.

In some examples, the load balancer may be implemented as a network appliance that is independent of the application server and the database server. Thus, the load balancer may be introduced in a cloud computing environment without considerably modifying existing infrastructure and applications, to improve response speed and service providing capacity of the mobile service.

Figure 1:
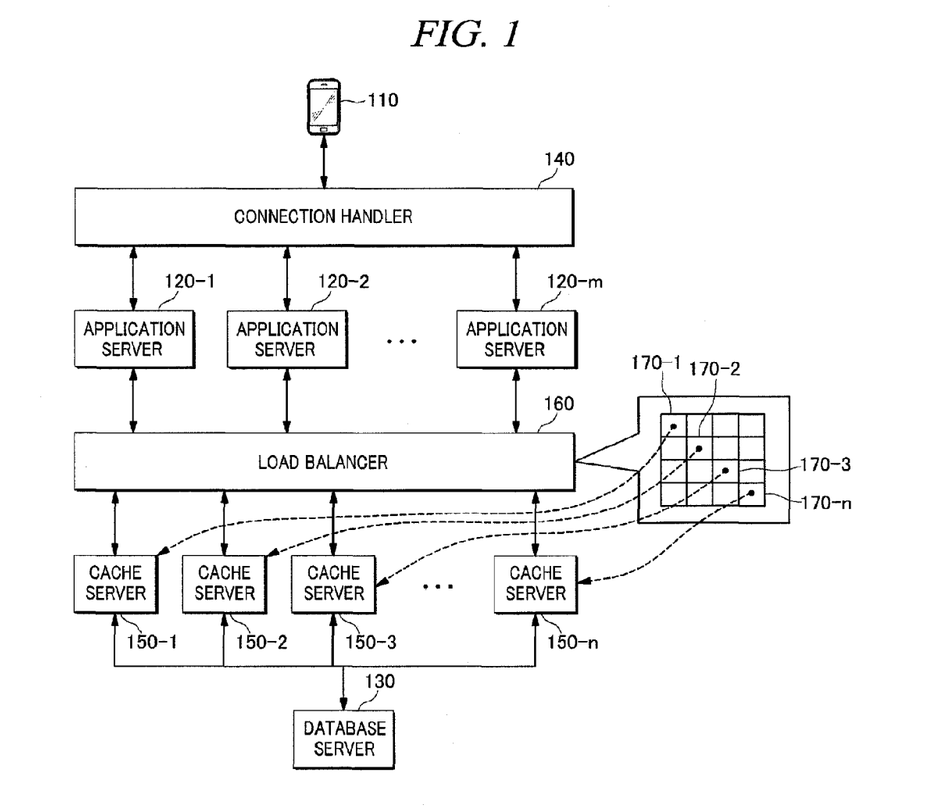
FIG. 1 schematically shows an illustrative example of an environment in which a load balancer provides load balancing between a database server and application servers, arranged in accordance with at least some embodiments described herein.

FIG. 1 schematically shows an illustrative example of an environment in which a load balancer provides load balancing between a database server and application servers, arranged in accordance with at least some embodiments described herein. As depicted in FIG. 1, a user device 110 may send to at least one of application servers 120-1, 120-2, . . . , 120-$m$ a request for geographical data, which may be stored in a database server 130. By way of example, but not limitation, the request may include an HTTP (Hypertext Transfer Protocol) request such as, for example, an HTTP GET request or an HTTP POST request.

In some embodiments, a connection handler 140 may allocate or assign the request from user device 110 to an appropriate one of application servers 120-1, 120-2, . . . , 120-$m$. In some embodiments, a connection handler 140 may allocate or assign the request based at least in part on processing loads of application servers 120-1, 120-2, . . . , 120-$m$.

In some embodiments, database server 130 may store the geographical data on a predetermined range or area of real-space. In some embodiments, cache servers 150-1, 150-2, . . . , 150-$n$ may cache at least some of the geographical data stored in database server 130. In some embodiments, cache servers 150-1, 150-2, . . . , 150-$n$ may respectively cache from database server 130 at least some of the geographical data associated with one of multiple cells in the predetermined range or area of real-space. By way of example, but not limitation, cache servers 150-1, 150-2, . . . , 150-$n$ may be in-memory cache servers. By way of example, but not limitation, respective sizes of the cells may vary depending on a total number of cache servers 150-1, 150-2, . . . , 150-$n$ provided in the cloud computing environment and/or memory capacity of cache servers 150-1, 150-2, 150-$n$. For example, when a sufficient number of cache servers 150-1, 150-2, . . . , 150-$n$ are provided in the cloud computing environment and the memory capacity thereof is also sufficient, the cell size may be set to be relatively small (e.g., a square with 10 meters on each side), while in cases where the number of cache servers 150-1, 150-2, . . . , 150-$n$ is not sufficient and/or the memory capacity thereof is small, the cell size may be set to be relatively large (e.g., a square with 1000 meters on each side).

In some embodiments, a load balancer 160 may manage an association between cache servers 150-1, 150-2, . . . , 150-$n$ and the real-space cells. By way of example, but not limitation, load balancer 160 may allocate cache servers 150-1, 150-2, . . . , 150-$n$ respectively to cells 170-1, 170-2, . . . , 170-$n$, and make cache servers 150-1, 150-2, . . . , 150-$n$ respectively cache or retrieve from database server 130 the geographical data associated with cells 170-1, 170-2, . . . , 170-$n$.

In some embodiments, load balancer 160 may also receive from at least one of application servers 120-1, 120-2, . . . , 120-$m$ the request from user device 110. Then, load balancer 160 may analyze the received request and extract therefrom an identifier and/or geolocation information associated with user device 110. By way of example, but not limitation, when the request is an HTTP request such as an HTTP GET request or an HTTP POST request, the identifier may include at least one of a cookie and an identification text string in the header of the HTTP request. By way of example, but not limitation, the geolocation information may include GPS (Global Positioning System) information.

In some embodiments, load balancer 160 may also calculate a probability of movement of user device 110 among cells based at least in part on the at least one of the identifier and geolocation information extracted from the request. By way of example, but not limitation, load balancer 160 may calculate probability of movement of user device 110 from the current location thereof to other cells, by taking into consideration the means of transport and/or moving speed of user device 110.

In some embodiments, load balancer 160 may also calculate a copy factor among cache servers 150-1, 150-2, ..., 150-n, i.e., an amount of cached data to copy among cache servers 150-1, 150-2, ..., 150-n, based at least in part on the calculated probability. By way of example, but not limitation, load balancer 160 may calculate the copy factor from cache server 150-2 corresponding to cell 170-2 to cache server 150-1 corresponding to cell 170-1, i.e., the amount of cached data to copy from cache server 150-2 corresponding to cell 170-2 to cache server 150-1 corresponding to cell 170-1, based at least in part on the calculated probability of movement of user device 110 from cell 170-1 to cell 170-2. In some embodiments, the copy factor from cache server 150-2 to cache server 150-1 may increase as the calculated probability of movement from cell 170-1 to cell 170-2 increases. In some embodiments, the copy factor from cache server 150-2 to cache server 150-1 may decrease as a distance between cell 170-1 and cell 170-2 increases.

An example of the copy factor for copying information from a cache server corresponding to point $x_2y_2$ in real-space to another cache server corresponding to point $x_1y_1$ in real-space, i.e., copy_factor($x_1y_1, x_2y_2$), may be calculated in accordance with example Formula 1 as follows:

$$\text{copy\_factor}(x_1y_1, x_2y_2) := \text{item\_count}(x_2y_2) \frac{\text{probability}(x_1y_1, x_2y_2)}{\text{distance}(x_1y_1, x_2y_2)^2} \quad \text{[Formula 1]}$$

For Formula 1, item_count($x_2y_2$) denotes an amount of cached data in the cache server corresponding to point $x_2y_2$, probability($x_1y_1, x_2y_2$) denotes the probability of movement of user device 110 from point $x_1y_1$ to point $x_2y_2$, and distance ($x_1y_1, x_2y_2$) denotes a real-space distance from point $x_1y_1$ to point $x_2y_2$.

Figure 2:
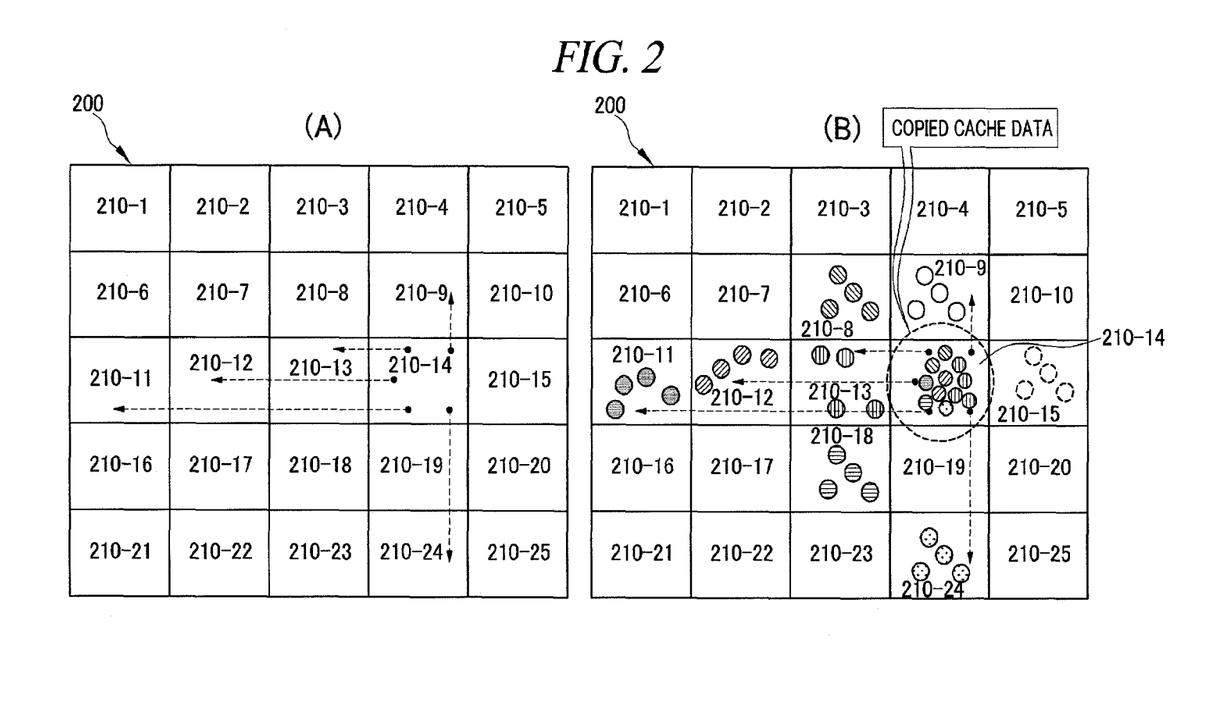
FIGS. 2(A)-(B) respectively show an illustrative example of a mesh structure for associating between cache servers and real-space cells, and an illustrative example of copying cached data among the cache servers, arranged in accordance with at least some embodiments described herein.

FIGS. 2(A)-(B) respectively show an illustrative example of a mesh structure for associating between cache servers and real-space cells, and an illustrative example of copying cached data among the cache servers, arranged in accordance with at least some embodiments described herein. As depicted, a predetermined range or area of real-space 200 may be divided into multiple cells 210-1, 210-2, ..., 210-25. Although FIGS. 2(A)-(B) illustrate that space 200 is divided into twenty-five same-sized cells 210-1, 210-2, ..., 210-25, it should be appreciated by one skilled in the relevant art that space 200 may also be divided into any number of and/or any sizes of cells.

In some embodiments, geographical data regarding cells 210-1, 210-2, ..., 210-25 may be stored in a database server (e.g., database server 130). Multiple cache servers (e.g., cache servers 150-1, 150-2, ..., 150-n) may retrieve and/or cache geographical data regarding cells 210-1, 210-2, ..., 210-25 from the database server to reduce number of accesses to the database server. In some embodiments, each of the multiple cache servers may be associated with or allocated to each of cells 210-1, 210-2, ..., 210-25, and cache the geographical data regarding the corresponding one of cells 210-1, 210-2, ..., 210-25.

As depicted in FIG. 2(A), when a user device 220 is currently located at cell 210-14, a load balancer (e.g., load balancer 160) may calculate probabilities of movement of user device 220 from cell 210-14 to other cells, and may calculate copy factors from other cache servers corresponding to the other cells to a cache server corresponding to cell 210-14. By way of example, but not limitation, when the load balancer finds and calculates the probabilities of movement of user device 220 from cell 210-14 to other cells as depicted in FIG. 2(A), and finds the amount of cached data in each of the cache servers corresponding to the cells as depicted in FIG. 2(B), the load balancer may calculate the respective copy factors from the cache servers corresponding to the other cells from the cache server corresponding to cell 210-14 in accordance with Formula 1 above.

Figure 3:
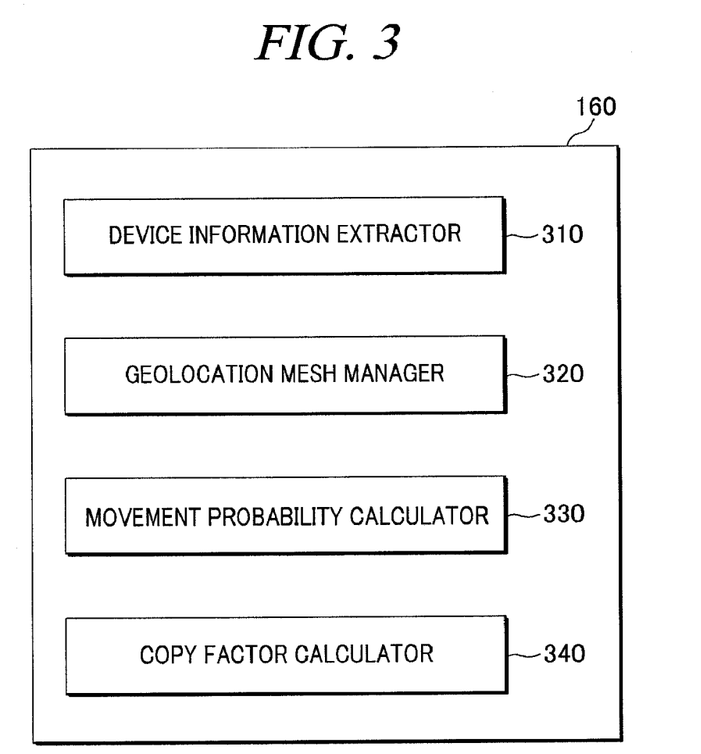
FIG. 3 shows a schematic block diagram of an illustrative example of a load balancer configured to provide load balancing between a database server and an application server, arranged in accordance with at least some embodiments described herein.

FIG. 3 shows a schematic block diagram of an illustrative example of a load balancer configured to provide load balancing between a database server and an application server, arranged in accordance with at least some embodiments described herein. As depicted, a load balancer 160 may include a device information extractor 310, a geolocation mesh manager 320, a movement probability calculator 330 and a copy factor calculator 340. Although illustrated as discrete components, various components may be divided into additional components, combined into fewer components, or eliminated altogether while being contemplated within the scope of the disclosed subject matter.

Device information extractor 310 may be configured to extract, from a stream received from a user device (e.g., user device 110), device information associated with the user device. In some embodiments, the device information may include at least one of an identifier and geolocation information associated with the user device. In some embodiments, the stream may stem from an HTTP (Hypertext Transfer Protocol) request from the user device, and the device information extractor may analyze a header of the HTTP request to extract at least one of the identifier and the geolocation information associated with the user device. By way of example, but not limitation, the geolocation information may include GPS (Global Positioning System) information. In some embodiments, the extracted device information may be used to find current location of the user device.

Geolocation mesh manager 320 may be configured to manage an association between cache servers (e.g., cache servers 150-1, 150-2, ..., 150-n) and real-space cells (e.g., cells 170-1, 170-2, ..., 170-n). Each of the cache servers may cache from a database server (e.g., database server 130) information regarding a cell allocated thereto. By way of example, but not limitation, each of the cache servers may cache from the database server geographical data regarding the corresponding one of the cells. In some embodiments, the cache servers may include in-memory cache servers. In some embodiments, geolocation mesh manager 320 may find relevant cache servers including a cache server corresponding to the current location of the user device.

Movement probability calculator 330 may be configured to calculate a probability of movement of the user device from a first cell to a second cell. In some embodiments, movement probability calculator 330 may calculate the probability based at least in part on moving speed of the user device. In some embodiments, movement probability calculator 330 may calculate probabilities of movement of the user device from the current location of the user device to other locations.

Copy factor calculator 340 may be configured to calculate a copy factor from a second cache server corresponding to the second cell to a first cache server corresponding to the first cell, that is, amount of cached data to copy from the second cache server corresponding to the second cell to the first cache server corresponding to the first cell based at least in part on the probability of movement calculated by movement probability calculator 330. In some embodiments, copy factor calculator 340 may calculate the copy factor from the second cache server to the first cache server by taking into consideration a distance between the first cell and the second cell. In some embodiments, copy factor calculator 340 may calculate amount of cached data to copy to the cache server corresponding to the current location of the user device from other cache servers, for managing or configuring the cache servers dynamically.

Figure 4:
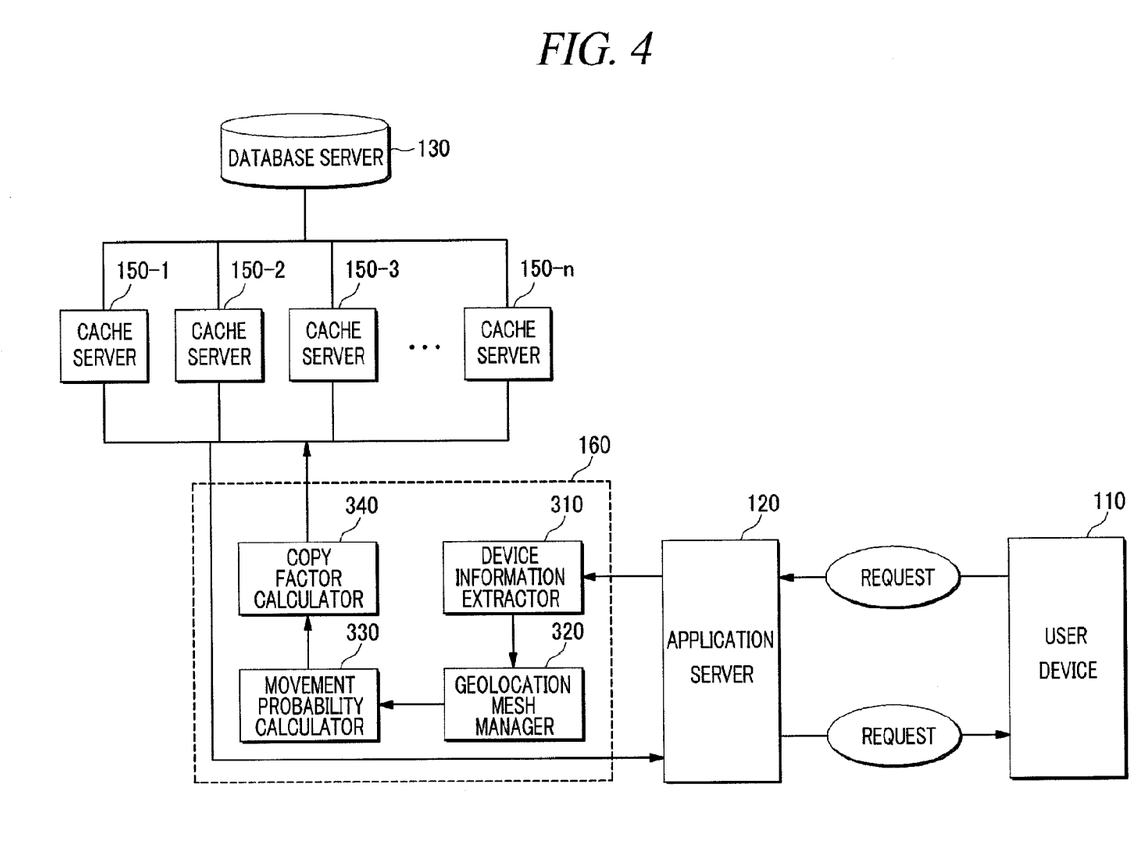
FIG. 4 schematically shows an illustrative example system configured to provide load balancing between a database server and an application server, arranged in accordance with at least some embodiments described herein.

FIG. 4 schematically shows an illustrative example system configured to provide load balancing between a database server and an application server, arranged in accordance with at least some embodiments described herein. As depicted, when a user runs or executes on user device 110 an application program such as, for example, a map application for a mobile service or an information distribution application based on geolocation information, user device 110 may send to an application server 120 a request for geographical data, which may be stored in database server 130. Then, application server 120 may send the received request to load balancer 160.

In some embodiments, device information extractor 310 in load balancer 160 may extract device information associated with user device 110 including an identifier and/or geolocation information associated with user device 110 from a stream including the request received from application server 120.

In some embodiments, geolocation mesh manager 320 in load balancer 160, which may manage an association between cache servers 150-1, 150-2, . . . , 150-n and real-space cells, may find relevant cache servers including a cache server corresponding to the current location of user device 110 based at least in part on the identifier and/or geolocation information associated with user device 110 extracted by device information extractor 310.

In some embodiments, movement probability calculator 330 in load balancer 160 may calculate a probability of movement of user device 110 from a first real-space cell, to which the current location of user device 110 may belong, to a second real-space cell, based at least in part on the dentifier and/or geolocation information associated with user device 110 extracted by device information extractor 310 and/or the relevant cache servers managed and/or found by geolocation mesh manager 320.

In some embodiments, copy factor calculator 340 in load balancer 160 may calculate an amount of cached data to copy from a second cache server corresponding to the second cell to a first cache server corresponding to the first cell based at least in part on the probability calculated by movement probability calculator 330.

In some embodiments, load balancer 160 may dynamically manage or configure cache servers 150-1, 150-2, . . . , 150-n by copying the calculated amount of cached data from the second cache server to the first cache server based at least in part on the amount of cached data to copy from the second cache server to the first cache server calculated by copy factor calculator 340.

Figure 5:
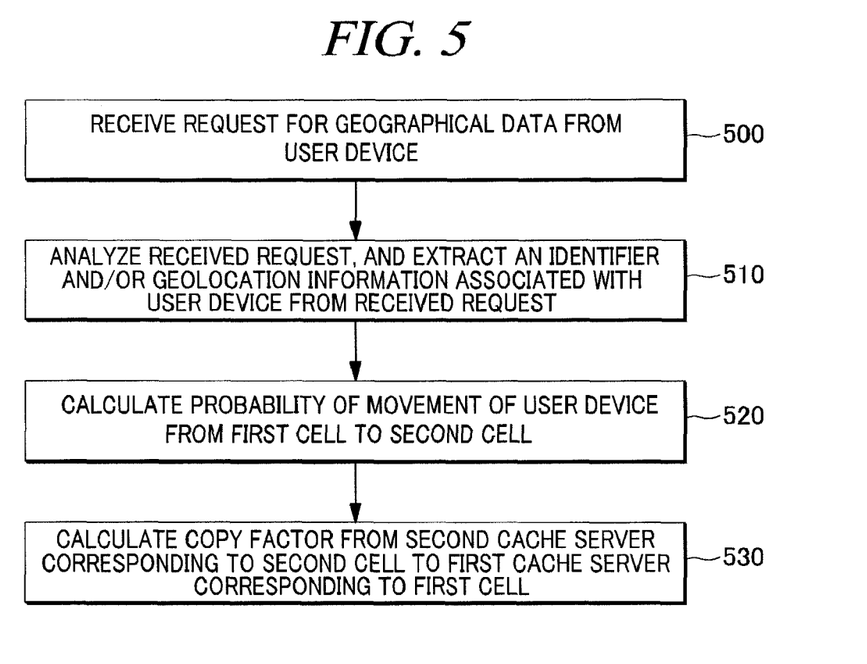
FIG. 5 shows an example flow diagram of a process for providing load balancing between a database server and an application server, arranged in accordance with at least some embodiments described herein.

FIG. 5 shows an example flow diagram of a process for providing load balancing between a database server and an application server, arranged in accordance with at least some embodiments described herein. The method in FIG. 5 may be implemented in a load balancer such as load balancer 160 including device information extractor 310, geolocation mesh manager 320, movement probability calculator 330 and copy factor calculator 340 discussed above. An example of the process may include one or more operations, actions, or functions as illustrated by one or more blocks 500, 510, 520 and/or 530. Although illustrated as discrete blocks, various blocks may be divided into additional blocks, combined into fewer blocks, or eliminated, depending on the desired implementation. Processing may begin at block 500.

At block 500, the load balancer may receive a request for geographical data stemming from a user device. By way of example, but not limitation, the request may include an HTTP (Hypertext Transfer Protocol) request such as, for example, an HTTP GET request or an HTTP POST request. Processing may continue from block 500 to block 510.

At block 510, the load balancer may analyze the received request, and extract an identifier and/or geolocation information associated with the user device from the received request. By way of example, but not limitation, when the request is an HTTP request such as an HTTP GET request or an HTTP POST request, the identifier may include at least one of a cookie and an identification text string in the header of the HTTP request. By way of example, but not limitation, the geolocation information may include GPS (Global Positioning System) information. Processing may continue from block 510 to block 520.

At block 520, the load balancer may calculate a probability of movement of the user device from a first cell to a second cell. In some embodiments, the load balancer may calculate the probability based at least in part on the at least one of the identifier and geolocation information extracted from the request. By way of example, but not limitation, the load balancer may calculate the probability by taking into consideration the means of transport and/or moving speed of the user device. Processing may continue from block 520 to block 530.

At block 530, the load balancer may calculate an amount of cached data to copy from a second cache server corresponding to the second cell to a first cache server corresponding to the first cell, i.e., a copy factor from the second cache server to the first cache server. In some embodiments, the load balancer may calculate the copy factor based at least in part on the calculated probability. In some embodiments, the load balancer may calculate the copy factor further based on a distance between the first cell and the second cell. The load balancer may dynamically manage or configure the cache servers by copying the calculated amount of cached data from the second cache server to the first cache server.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
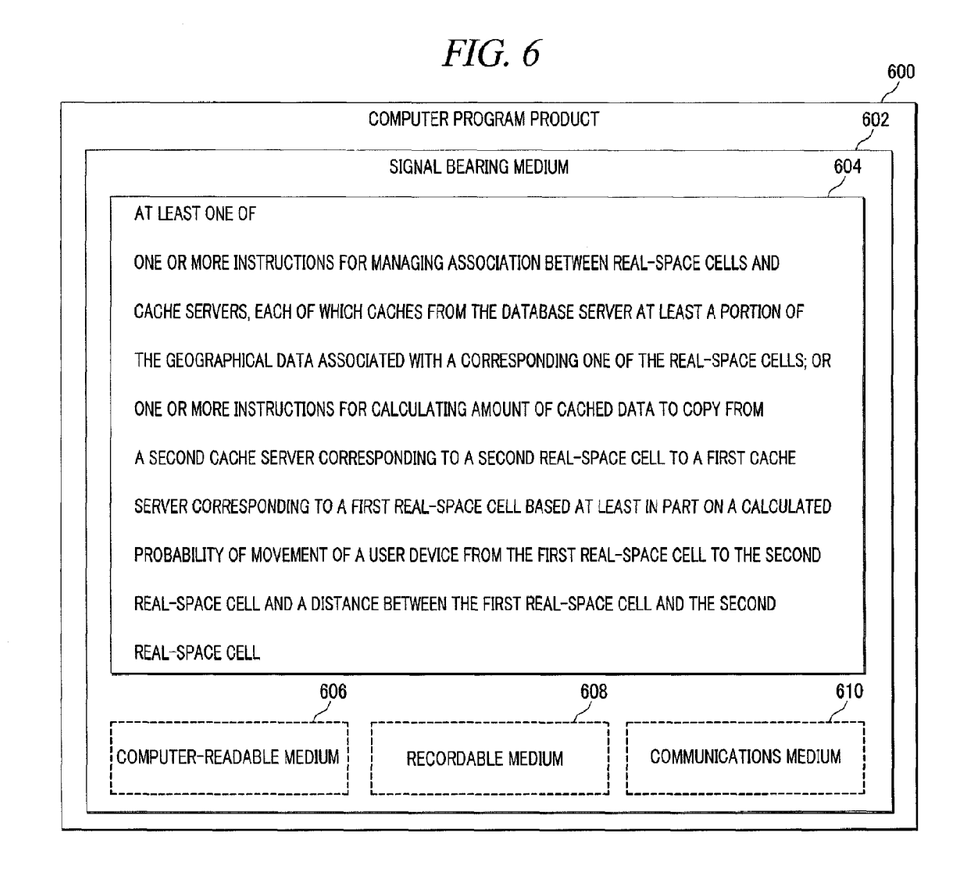
FIG. 6 illustrates computer program products that can be utilized to provide load balancing between a database server and an application server, arranged in accordance with at least some embodiments described herein.

FIG. 6 illustrates computer program products that may be utilized to provide load balancing between a database server and an application server, arranged in accordance with at least some embodiments described herein. Program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for managing association between real-space cells and cache servers, each of which caches from the database server at least a portion of the geographical data associated with a corresponding one of the real-space cells; one or more instructions for calculating amount of cached data to copy from a second cache server corresponding to a second real-space cell to a first cache server corresponding to a first real-space cell based at least in part on a calculated probability of movement of a user device from the first real-space cell to the second real-space cell and a distance between the first real-space cell and the second real-space cell. Thus, for example, referring to FIG. 3, load balancer 160 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of load balancer 160 by an RF signal bearing medium 602, where the signal bearing medium 602 is conveyed by a wireless communications medium 610 (e.g., a wireless communications medium conforming with the IEEE 802.11 standard).

Figure 7:
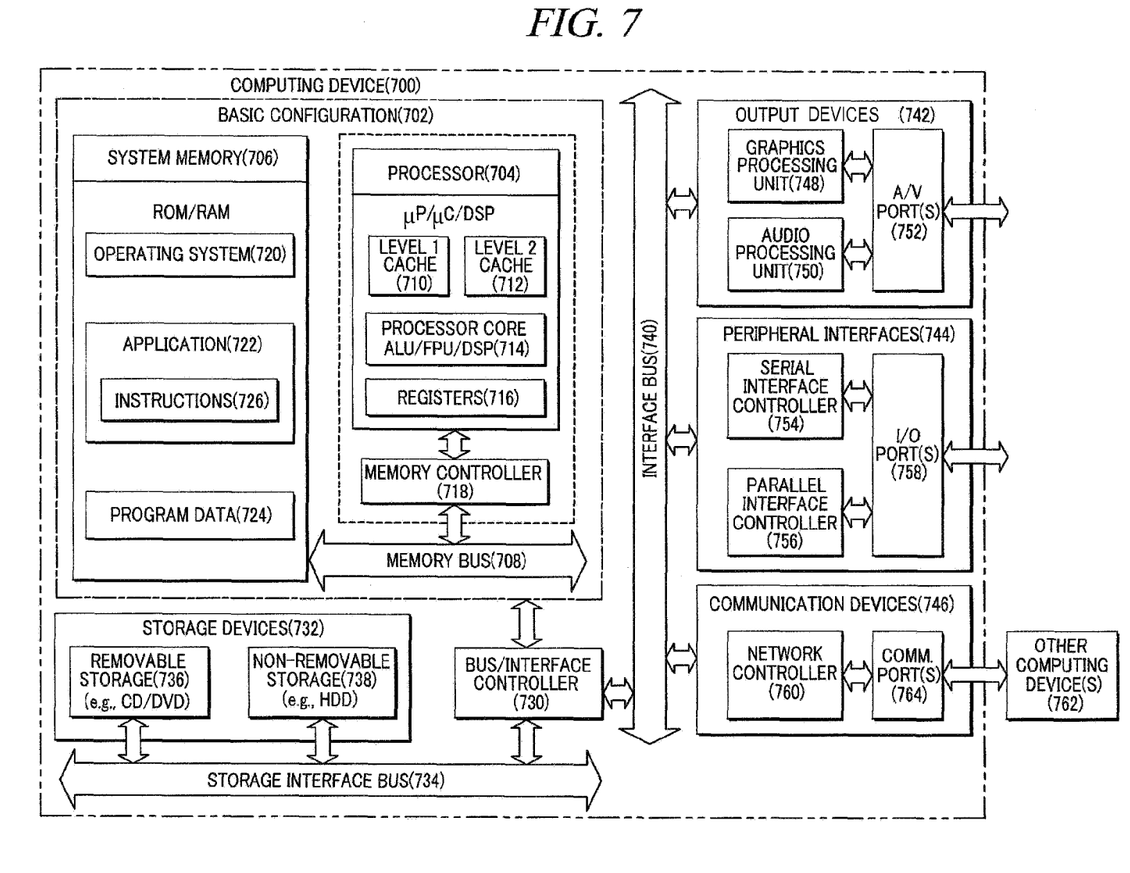
FIG. 7 is a block diagram illustrating an example computing device that can be utilized to provide load balancing between a database server and an application server, arranged in accordance with at least some embodiments described herein.

FIG. 7 is a block diagram illustrating an example computing device that can be utilized to provide a load balancing between a database server and an application server, arranged in accordance with at least some embodiments described herein. In these examples, elements of computing device 700 may be arranged or configured for a cloud computing system hosting a mobile service. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µR), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include instructions 726 that may be arranged to perform the functions as described herein including the actions described with respect to the architecture of load balancer 160 as shown in FIG. 3 or including the actions described with respect to the flow charts shown in FIG. 5. Program data 724 may include data that may be utilized for implementing instructions 726 (e.g., a mesh structure for associating between cache servers and real-space cells). In some examples, application 722 may be arranged to operate with program data 724 on an operating system 720 such that implementations for instructions for a load balancer as described herein.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method comprising:
   calculating a probability of movement of a user device from a first cell to a second cell; and
   calculating an amount of cached data to copy from a second cache server corresponding to the second cell to a first cache server corresponding to the first cell based at least in part on the calculated probability,
   wherein the first cache server caches data regarding the first cell, and the second cache server caches data regarding the second cell.

2. The method of claim 1, further comprising:
   receiving a request for geographical data from the user device; and extracting at least one of an identifier and geolocation information associated with the user device from the received request, wherein the calculating the probability of movement is based on the at least one of the extracted identifier and geolocation information.

3. The method of claim 2, wherein the request includes an HTTP (Hypertext Transfer Protocol) request, and wherein the extracting at least one of the identifier and the geolocation information includes analyzing a header of the HTTP request.

4. The method of claim 3, wherein the HTTP request includes an HTTP GET request or an HTTP POST request, and the identifier includes at least one of a cookie and an identification text string in the header of the HTTP GET request or the HTTP POST request.

5. The method of claim 2, wherein the geolocation information includes GPS (Global Positioning System) information.

6. The method of claim 1, wherein the calculating the probability of movement of the user device is based at least in part on a moving speed of the user device.

7. The method of claim 1, wherein the first cache server and the second cache server are in-memory cache servers.

8. The method of claim 1, wherein the first cache server and the second cache server respectively cache from a database server geographical data on the first cell and geographical data on the second cell.

9. The method of claim 1, wherein the amount of cached data to copy increases with the calculated probability of movement.

10. The method of claim 1, wherein the calculating amount of cached data to copy is based at least in part on a distance between the first cell and the second cell.

11. The method of claim 1, wherein the first cell and the second cell are substantially a same size with each other.

12. The method of claim 1, wherein respective sizes of the first cell and the second cell vary depending on at least one of total number of cache servers and memory capacity of the cache servers.

13. The method of claim 1, further comprising:
copying the calculated amount of cached data from the second cache server to the first cache server.

14. A load balancer, comprising:
a device information extractor configured to extract, from a stream received from a user device, at least one of an identifier and geolocation information associated with the user device;
a geolocation mesh manager configured to manage an association between cache servers and real-space cells, wherein each cache server caches, from a database server, information regarding a cell allocated thereto;
a movement probability calculator configured to calculate a probability of movement of the user device from a first real-space cell to a second real-space cell; and
a copy factor calculator configured to calculate amount of cached data to copy from a second cache server corresponding to the second real-space cell to a first cache server corresponding to the first real-space cell based at least in part on the calculated probability of movement.

15. The load balancer of claim 14, wherein the stream stems from an HTTP (Hypertext Transfer Protocol) request from the user device, and
wherein the device information extractor is further configured to analyze a header of the HTTP request to extract at least one of the identifier and the geolocation information associated with the user device.

16. The load balancer of claim 14, wherein the geolocation information includes GPS (Global Positioning System) information.

17. The load balancer of claim 14, wherein the first cache server and the second cache server are in-memory cache servers.

18. The load balancer of claim 14, wherein the first cache server and the second cache server respectively cache, from the database server, geographical data regarding the first real-space cell and geographical data on the second real-space cell.

19. The load balancer of claim 14, wherein the movement probability calculator is further configured to calculate the probability based at least in part on moving speed of the user device.

20. The load balancer of claim 14, wherein the copy factor calculator is further configured to calculate the amount of cache copy from the second cache server to the first cache server based at least in part on distance between the first real-space cell and the second real-space cell.

21. The load balancer of claim 14, wherein sizes of the first real-space cell and the second real-space cell vary depending on at least one of total number of cache servers and memory capacity of the cache servers.

22. A non-transitory computer-readable storage medium that stores a program for implementing load balancing between a database server storing geographical data and a Web application server, the program comprising:
a geolocation mesh managing module configured to manage association between real-space cells and cache servers, each of which caches from the database server at least a portion of the geographical data associated with a corresponding one of the real-space cells; and
a copy factor calculating module configured to calculate amount of cached data to copy from a second cache server corresponding to a second real-space cell to a first cache server corresponding to a first real-space cell based at least in part on a calculated probability of movement of a user device from the first real-space cell to the second real-space cell and a distance between the first real-space cell and the second real-space cell.

23. The non-transitory computer-readable storage medium of claim 22, wherein the program further comprises:
an HTTP (Hypertext Transfer Protocol) header analyzing module configured to analyze an HTTP request from the user device and extract from the HTTP request at least one of an identifier and geolocation information associated with the user device.

24. The non-transitory computer-readable storage medium of claim 22, wherein the first cache server and the second cache server are in-memory cache servers.

* * * * *

UNITED STATES PATENT AND TRADEMARK OFFICE
CERTIFICATE OF CORRECTION

PATENT NO.        : 8,929,896 B2
APPLICATION NO.   : 13/640888
DATED             : January 6, 2015
INVENTOR(S)       : Kurabayashi et al.

It is certified that error appears in the above-identified patent and that said Letters Patent is hereby corrected as shown below:

On the Title page, in Column 1, Line 1, delete item "(76)" and insert item -- (75) --, therefor.

In the Specification

In Column 1, Line 1, below "Title", insert -- CROSS-REFERENCE TO RELATED APPLICATION
The present application is a U.S. national stage filing under 35 U.S.C. § 371 of International Application No. PCT/US2012/026521, filed on Feb. 24, 2012. --.

In Column 7, Line 47, delete "dentifier" and insert -- identifier --, therefor.

In Column 9, Line 46, delete "(μR)," and insert -- (μP), --, therefor.

Signed and Sealed this
Twenty-eighth Day of July, 2015

Michelle K. Lee
*Director of the United States Patent and Trademark Office*